(No Model.) 3 Sheets—Sheet 1.
W. F. WILSON.
STREET SWEEPER.
No. 512,854. Patented Jan. 16, 1894.
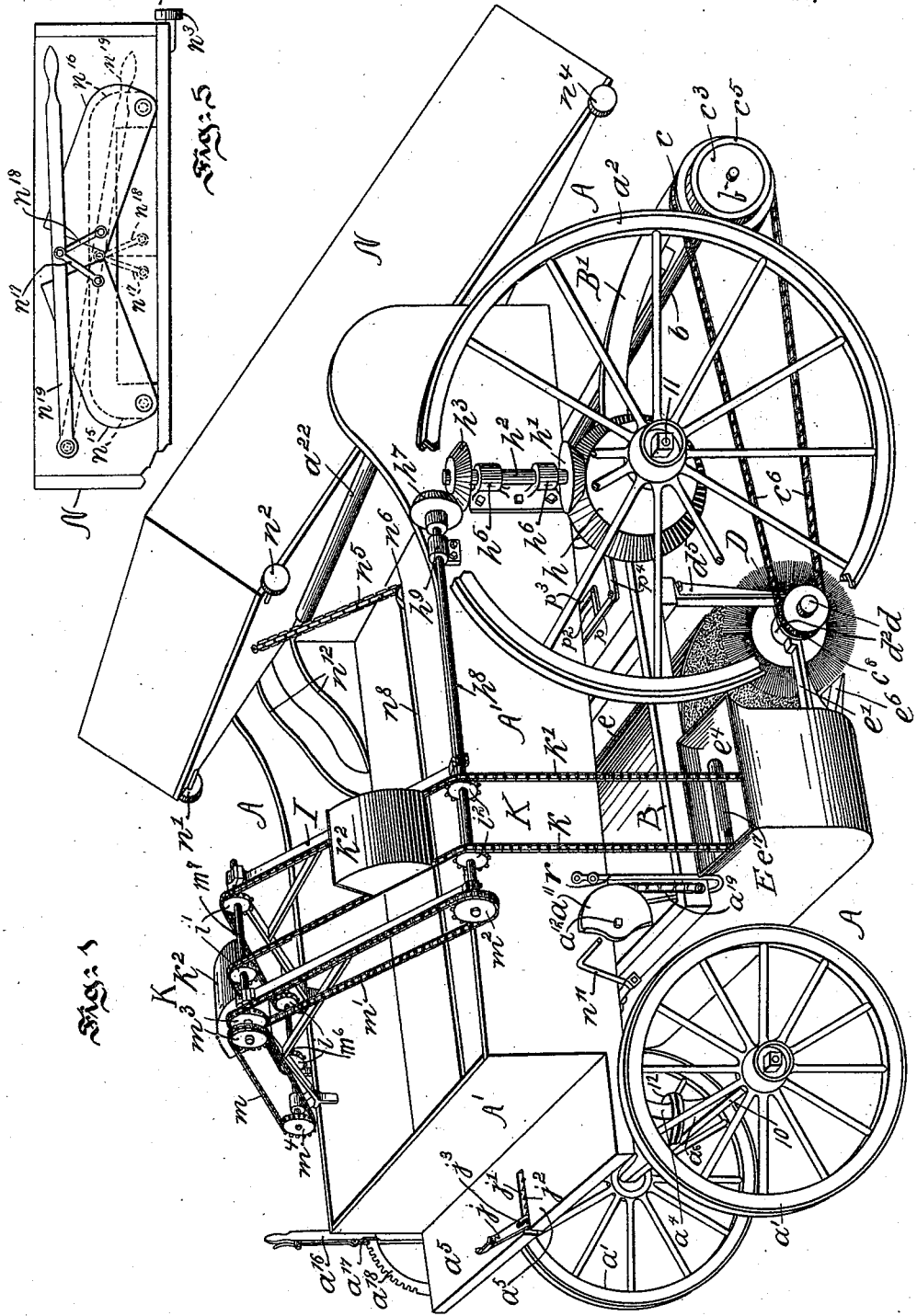
Witnesses:
Thomas M. Smith
Wilhelm Vogt
Inventor.
William F. Wilson,
By J. Walter Douglas,
Attorney.

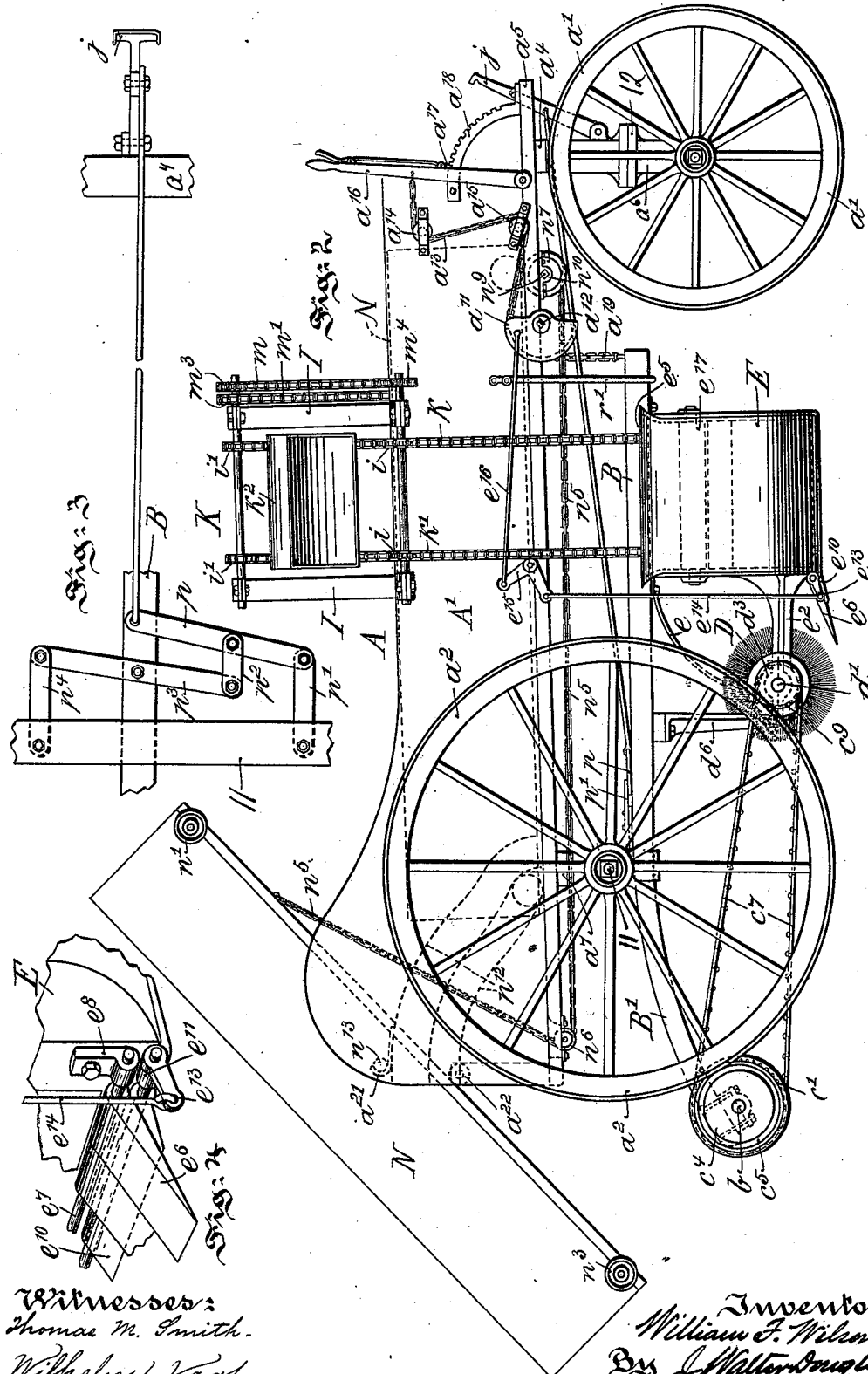

(No Model.) 3 Sheets—Sheet 3.
W. F. WILSON.
STREET SWEEPER.
No. 512,854. Patented Jan. 16, 1894.
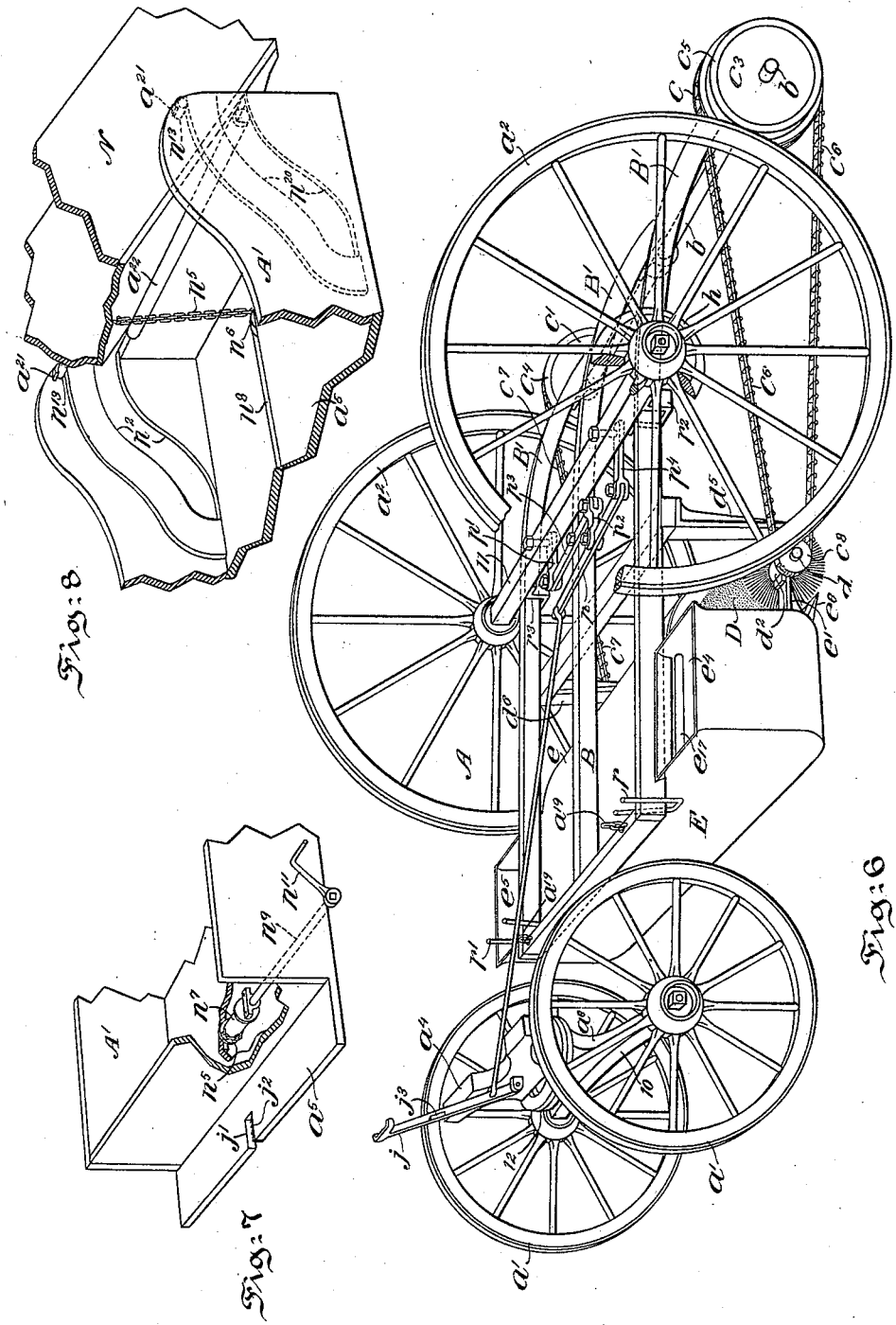
Witnesses:
Richard C. Maxwell
Thomas M. Smith
Inventor:
William F. Wilson,
By J. Walter Douglass.
Attorney.

UNITED STATES PATENT OFFICE.

WILLIAM F. WILSON, OF NORRISTOWN, PENNSYLVANIA.

STREET-SWEEPER.

SPECIFICATION forming part of Letters Patent No. 512,854, dated January 16, 1894.

Application filed August 16, 1893. Serial No. 483,287. (No model.)

*To all whom it may concern:*

Be it known that I, WILLIAM F. WILSON, a citizen of the United States, residing at Norristown, in the county of Montgomery and State of Pennsylvania, have invented certain new and useful Improvements in Street-Sweeping Machines, of which the following is a specification.

My invention has relation to street sweeping machines or vehicles adapted to collect extraneous matter and to automatically gather and discharge the same into a carrier so as to permit of dumping of the matter therefrom; and it relates more particularly to the general construction and arrangement of such a machine or vehicle.

The principal objects of my invention are, first, to provide a machine or vehicle adapted for street sweeping and so constructed and arranged that extraneous matter shall in the operation of the machine or vehicle be automatically collected and discharged into a carrier in order to permit of the accumulating matter deposited therein being removed therefrom; second, to provide a street sweeping machine or vehicle with appliances and mechanism connected therewith and arranged so that by frictional contact of a roller or rollers of a movable frame with a revolving member or members of the machine or vehicle the collecting, gathering and discharging appliances or devices thereof are adapted to be brought into and out of action; third, to provide a street sweeping machine with two or more wheels having a movable frame carrying a gathering box with movable fingers located in proximity to a revoluble brush operated through the intervention of suitable mechanism by contact of certain of the wheels of the machine or vehicle with a roller or rollers connected with said movable frame and frictionally engaging the wheels of the machine or vehicle and a lever controlling mechanism for causing said roller or rollers to be brought into frictional contact with the wheels of the machine or vehicle; and, fourth, to provide a street sweeping machine or vehicle so constructed and arranged as that in the travel thereof, matter is automatically collected and by means of an endless conveyer gathered and discharged into a carrier connected with the body of the vehicle in such manner as to permit of the discharge of the same therefrom by causing the carrier to assume an inclined position with respect to the body of the machine or vehicle.

My invention consists of a street sweeping machine or vehicle constructed, arranged and adapted for operation in substantially the manner hereinafter described and pointed out in the claims.

The nature and general features of my invention will be more fully understood from the following description taken in connection with the accompanying drawings forming a part hereof, and in which—

Figure 1, is a perspective view of a machine or apparatus embodying the features of my invention, with the movable-carrier thereof shown in a position to permit of the dumping of accumulated matter therefrom. Fig. 2, is a side elevational view of the right hand side of the vehicle of Fig. 1, with the detail construction and arrangement of the mechanisms thereof, shown in application thereto. Fig. 3, is a detached plan view of the lever for bringing the frictional rollers of the movable-frame into contact with the rear road-wheels of the vehicle in the manner illustrated in Figs. 1 and 2. Fig. 4, is a perspective view broken away, showing certain of the movable fingers connected with the gathering-box of the machine for insuring of the matter as gathered by the brush being delivered into the collecting box or chute, as fully illustrated in Figs. 1 and 2. Fig. 5, is an end view of the slotted back or tail-board of the movable-carrier with the pivotal gates thereof operated by means of a lever to open and close the same. Fig. 6, is a perspective view of the body gear mechanism with the swinging frame movable longitudinally in respect to the general plane of the vehicle by means of a foot lever and also showing connected with said frame the gathering box, revoluble brush, friction rollers and operating mechanism of the sweeping appliance embodying certain of the features of my invention. Fig. 7, is a similar view of the front portion of the wagon body in broken section and removed from the running gear thereof and showing the shaft operated by a crank-arm and provided with a spool onto which the chain or cord is wound in the rearward movement of the carrier of the vehicle; and Fig. 8, is a similar view of the rear portion of the wagon body in broken section, showing the inclines on the sides thereof and along which the movable carrier of the machine travels in the rearward movement of the same by means of the cord or chain by the actuation of the shaft by means of the crank-arm of Figs. 1 and 7.

Referring to the drawings A, is the vehicle provided with front and rear road-wheels $a'$ and $a^2$, connected with front and rear axles 10 and 11.

$a^4$, is a pivotal support engaging the bottom board $a^5$, of the body of the vehicle. $a^6$, is a similar support mounted on the front axle 10. Interposed between the supports $a^4$ and $a^6$, and in pivotal engagement therewith are wheels 12, for permitting of the turning about of the front wheels $a'$.

$a^7$, is the rear body support engaging respectively with the bottom of the vehicle body $A'$, and the rear axle 11.

B, is a carrier frame supported from the rear portion thereof by means of staples or loops $r^2$ and $r^3$, secured to the under side of the rear axle 11, as clearly shown in Fig. 6, and at the front end thereof by means of stirrups $r$ and $r'$, secured respectively to the sides and bottom of the vehicle body $A'$. This carrier frame has curved rear extremities $B'$, to which is journaled a shaft $b$, having sprocket wheels $c$ and $c'$, and friction rollers $c^3$ and $c^4$. These friction rollers are preferably provided around their respective peripheries with rubber or other suitable material $c^5$, in order that in contacting with the rear road-wheels $a^2$, the required friction may be insured between the road-wheels $a^2$, and friction rollers $c^3$ and $c^4$, so as to impart motion from the sprocket-wheels $c$ and $c'$, through the intervention of the sprocket chains $c^6$ and $c^7$, to the sprocket-wheels $c^8$, and $c^9$, mounted on the end journals $d$ and $d'$, of the revoluble brush D, when the foot lever controlling the link or lever mechanism to be hereinafter described is actuated to cause the friction rollers $c^3$ and $c^4$, to engage the road wheels $a^2$. These journals $d$ and $d'$, of the revoluble brush D, are held in bearings $d^2$ and $d^3$, of the depending arms $d^5$ and $d^6$, connected with the longitudinal carrier-frame B.

$j$, is a lever pivotally connected with the front support $a^4$, of the body $A'$, and engaging a slot $j'$, in the front board or foot rest $a^5$, provided with a rack $j^2$, which is engaged by a pawl $j^3$, connected with the lever $j$. This lever $j$, is connected by means of a longitudinal rod with a series of compound levers or link mechanism $p, p', p^2, p^3$ and $p^4$, which are respectively connected with each other and with the movable carrier-frame B, and rear-road-wheel axle 11, as fully illustrated in Fig. 6, whereby in the operation of the lever $j$, by engaging the foot therewith, the longitudinal carrier B, is movable in the direction of the plane thereof and the friction rollers $c^3$ and $c^4$, are brought into frictional contact with the rear road-wheels $a^2$, for rotating the sprocket-wheels $c$ and $c'$, and $c^8$ and $c^9$, through the intervention of the sprocket chains $c^6$ and $c^7$.

E, is a gathering box supported from the longitudinal carrier-frame B, and provided with a hood $e$.

$e'$ and $e^2$, Figs. 1, 2 and 6, are arms suitably connected with the depending arms $d^5$ and $d^6$, and wall of the gathering box E, and forming in connection with the depending arms $d^5$ and $d^6$, the bearing supports for the journals of the revoluble brush D. The gathering box E, is provided with end throats $e^4$ and $e^5$, as illustrated in Figs. 1, 2 and 5, for the passage of bucket conveyers downward and upward therethrough in a manner to be presently explained.

$e^6$, is a series of vibrating or movable fingers mounted on a rod $e^7$, secured in bearings $e^8$, provided at or near the base of the gathering box E.

$e^{10}$, is a wing lever journaled at $e^{11}$, to the base of the box E, beneath the movable fingers $e^6$, and provided with an end loop $e^{13}$, for the reception of a vertical rod $e^{14}$, pivotally connected with a bell crank lever $e^{15}$, which is pivoted to the right hand side of the vehicle body $A'$, as illustrated in Fig. 2. This bell crank lever $e^{15}$, has pivoted thereto at one extremity a longitudinal rod or arm $e^{16}$, which latter is connected at its other extremity to one of the double grooved sector wheels $a^{11}$, which are respectively mounted on the ends of the shaft $a^{12}$, extending crosswise of the vehicle body $A'$, and held in bearings secured to the bottom thereof.

$a^{13}$, is a cord or chain secured to or engaging one of the grooves in the sector wheel $a^{11}$, on the right hand side of the vehicle body $A'$, and passing around pulleys $a^{15}$ and $a^{14}$, which are secured to this side of the body $A'$, of the vehicle. The chain or cord $a^{13}$, is then connected with a lever $a^{16}$, which is attached to the side of the body $A'$, and provided with a spring controlled locking pawl $a^{17}$, engaging a sector rack $a^{18}$, which is secured to the body of the vehicle A. On each side of the vehicle is provided a cord or chain $a^{19}$, whereof one end is connected with a movable carrier frame B, and whereof the other end engages a groove in each of the sector-wheels $a^{11}$, whereby the carrier B, can be elevated through the actuation of the lever $a^{16}$, and the intermediate connections hereinbefore fully explained.

In the movement of the lever $a^{16}$, in order to raise the frame B, the fingers $e^6$, of the gathering box E, through the intervention of the lever mechanism hereinbefore described connected with the horizontal wing lever $e^{10}$, is actuated to cause the fingers $e^6$, to be brought into contact with the peripheral surface of the revoluble brush D, simultaneously with the movement of the frame B, in an upward direction. A release of the lever $a^{16}$, from its locked position in connection with the rack $a^{18}$, will again lower the frame B, to its initial position and with it the fingers to an inclined position with respect to the bottom of the box E, in order that in the rotation of the brush D, matter may be effectually swept into the box preparatory to the same being gathered again by the buckets of the endless conveyer to be presently fully explained.

To one of the hub members of the rear road-wheels $a^2$, is secured a miter-wheel $h$, engaging a complemental miter-gear wheel $h'$, which is mounted on a vertical shaft $h^2$, carrying a miter-gear wheel $h^3$. The shaft $h^2$, is journaled in bearings $h^5$ and $h^6$, suitably secured to the left side of the vehicle body A', as illustrated in Fig. 1. The miter-gear wheel $h^3$, mounted on the shaft $h^2$, meshes with a complemental gear wheel $h^7$, mounted on a longitudinal shaft $h^8$, which is journaled to the left side of the body of the vehicle A, at $h^9$, and in a frame work connected with the body of the vehicle and carrying a series of pulleys or sprocket-wheels $i$, $i'$ and $i^2$, for the reception of chains $k$ and $k'$, of an endless conveyer K, provided with buckets $k^2$, and passing around pulleys or rolls $e^{17}$, journaled in the walls of the gathering box E. A sprocket-wheel $m^2$, is mounted on the end of the shaft $h^8$, and sprocket-wheels $m^3$ and $m^4$, are mounted upon other shafts $m^7$ and $m^6$, journaled to the frame-work I. Motion is communicated from the sprocket-wheel $m^2$, to the sprocket-wheels $m^3$ and $m^4$, by means of chains $m$ and $m'$. As the sprocket-wheels $m^2$, $m^3$ and $m^4$, are mounted upon the shafts upon which the sprocket-wheels $i$, $i'$ and $i^2$, are mounted, it follows that motion is communicated by the shaft $h^8$, to the sprocket-wheels $m^2$, $m^3$ and $m^4$, and to the sprocket-wheels $i$, $i'$ and $i^2$. By means of the chains $k$ and $k'$, the sprocket wheels $i$, $i'$ and $i^2$, in turn communicate motion to the endless conveyer K, thereby causing it to gather the accumulating matter collected into the box E, and to convey the same therefrom by means of the buckets $k^2$, or other somewhat similar appliances into the movable-carrier N, mounted in the body of the vehicle and provided with rollers $n'$, $n^2$, $n^3$ and $n^4$, at or near the respective extremities thereof.

$n^5$, is a cord or chain passing over a pulley $n^6$, in the rear part of the bottom of the body A', of the vehicle A, and $n^7$, is a pulley in the front portion of the bottom located adjacent to an oblong slot $n^8$, formed in the bottom of the body A'. This pulley $n^7$, as illustrated in Figs. 2 and 7, is securely mounted on a shaft $n^9$, which is held in bearings $n^{10}$, in the bottom of the vehicle body A', and provided with a hand-crank $n^{11}$, applied at the left hand side of the vehicle body A', to the shaft $n^9$, as illustrated in Figs. 1 and 7, whereby in the revolution of this hand-crank the cord or chain $n^5$, is wound onto the pulley $n^7$, secured to the shaft $n^9$, thereby causing the carrier N, to travel rearward in the body and upward along the grooved inclines $n^{12}$ and $n^{20}$, provided in the inner side walls of the body of the vehicle A', so as to permit the carrier N, to assume the position as illustrated in Figs. 1, 2 and 8, to cause in such tilted position, the contents to be discharged through the pivotal gates in the rear wall or tail-board of the movable-carrier N. To the sides of the movable carrier N, are provided stops or pins $n^{13}$, as illustrated in Figs. 2 and 8, which at the extreme rearward movement of the carrier and in the position shown for example in Figs. 1, 2 and 8, contact with complemental retaining catches $a^{21}$, as illustrated in Figs. 2 and 8, in the inclined interior surface of the vehicle body A', in order to prevent the carrier N, from assuming such a position as would cause the same when loaded to be precipitated from the rear of the body A', of the vehicle A. In the rear wall of the movable carrier N, are provided hinged gates $n^{15}$ and $n^{16}$, having links $n^{17}$ and $n^{18}$, pivoted thereto and to a lever $n^{19}$, as clearly shown in Fig. 5, whereby in the raising of said gates accumulating matter in the carrier may be readily removed through said hinged gates into a suitable receptable or onto a dump. The carrier N, may be caused to assume again its normal position in contact with the body of the vehicle by a manual movement of the same from the position which it occupies as illustrated in Figs. 1, 2 and 8, so as to occupy a position parallel to the general plane of the vehicle body A', by the attendant in charge grasping the front end of the movable carrier N, and drawing the same in a forward direction through the body A', of the vehicle A. In the rear of the body A', is provided a roll $a^{22}$, adapted to permit the bottom of the carrier N, to roll over the surface thereof, without undue friction or wear, when the crank $n^{11}$ is operated to actuate said carrier and so as to assume a downwardly inclined position to permit of the discharge of matter from the rear end thereof.

The mode of operation of the apparatus hereinbefore described is as follows:—The parts are caused to assume the position illustrated in Fig. 1, with the exception of the movable carrier N, which it is understood normally occupies a position in the body of the vehicle A', parallel to the general plane thereof. The lever $j$, is then extended by contact of the foot of the attendant-in-charge of the vehicle therewith, and in the position, for example, as illustrated in Figs. 1 and 2, which will actuate the compound levers or link mechanism $p$, $p'$, $p^2$, $p^3$ and $p^4$, in such manner as to bring the friction rollers $c^3$ and $c^4$, in frictional contact with the rear road-wheels $a^2$, in order thereby to impart motion to the sprocket-wheels $c$, $c'$, $c^8$ and $c^9$, through the intervention of the sprocket chains $c^6$ and $c^7$, to revolve the brush D, gathering into the box E, extraneous matter and simultaneously and automatically therewith motion is imparted to the series of miter-gear wheels $h$, $h'$, $h^3$ and $h^7$, to impart motion to the shaft $h^8$, carrying the sprocket-wheels $i^2$ and $m^2$, which in turn impart motion to the chains $k$, $k'$, $m$ and $m'$, and the sprocket wheels $i$, $i'$, $m^3$ and $m^4$, to control the movement of the endless bucket conveyer K, with the gathered matter, lifting the same in an upward direction into the movable-carrier N, in the body A', of the vehicle A. The movable fingers $e^6$, connected with the gathering-box E, occupy a position at a slight angle to the bottom of the box E, in the operation of the machine, in order to aid in the lifting by means of the brush D, of the extraneous matter into the box prior to the automatic gathering of the same and the subsequent discharge thereof into the movable carrier N. By operating the hand crank $n^{11}$, on the left hand side of the vehicle the strap or cord $n^5$, connected with the carrier N, and passing around the pulley $n^6$, is wound around the pulley $n^7$, on the shaft $n^9$, to permit the carrier N, to travel rearward in the body A', and to assume the position illustrated in Figs. 1 and 2, so as to cause the discharge of the extraneous matter therefrom through the movable gates $n^{15}$ and $n^{16}$, in the tail-board of the carrier, into any suitable receptacle or onto a dump by the actuation of the lever $n^{19}$. This carrier N, is caused to assume its initial position in the body of the vehicle and parallel to the general plane thereof by a forward hand operation against the front end of the carrier by the attendant in charge of the vehicle. When it is required to raise the movable frame B, from its operative position and with it the friction-rollers $c^3$ and $c^4$, out of contact with the rear-wheels $a^2$, such action may be readily effected and at the same time the movable fingers $e^6$, automatically lifted through the intervention of the lever $a^{16}$, and its connected mechanism as hereinbefore explained and as illustrated in Figs. 1 and 2; and moreover, with the friction rollers $c^3$ and $c^4$, maintained out of contact with the road-wheels $a^2$, by the locking of the lever $a^{16}$, by means of its pawl with the rack $a^{18}$, on the side of the vehicle and foot-rest or bottom-board $a^5$, thereof.

It will be manifestly obvious that as to minor details, various modifications may be made as to the arrangement of parts of the mechanism such as hereinbefore described for the operation of a street sweeping appliance of my invention and without departing from the spirit thereof.

Having thus described the nature and objects of my invention, what I claim as new, and desire to secure by Letters Patent, is—

1. The combination, in a street sweeping machine, of a revoluble brush, friction-rollers, means connected with said brush and rollers and adapted to permit of the actuation thereof, a movable carrier-frame provided with a gathering-box, mechanism connected with said frame and body of the machine and adapted to adjust the position of said box and to cause said friction rollers by the movement of said frame to be thrown into and out of engagement with certain of the road-wheels of the machine, substantially as and for the purposes set forth.

2. The combination, in a street sweeping machine, of a movable frame carrying a gathering-box, with a hood, a revoluble brush and friction rollers, means connected with said frame and operated to adjust the vertical position of said box and to throw said friction rollers into and out of engagement with certain of the road-wheels, and a sprocket mechanism connected with said brush and friction-rollers and adapted to permit of the actuation thereof, substantially as and for the purposes set forth.

3. The combination, in a street sweeping machine, of a movable frame having a depending gathering-box with movable fingers, a revoluble brush and friction-rollers, means connecting said brush with said friction-rollers to impart motion to said brush, means connected with said frame and one of the axle-supports and provided with a lever adapted in the operation thereof to cause said friction-rollers to be brought into and out of engagement with certain of the road-wheels, substantially as and for the purposes set forth.

4. The combination, in a street sweeping machine, of a movable-frame provided with a gathering-box having movable-fingers, a revoluble-brush and friction-rollers, means connected with said brush and rollers for permitting of the actuation of the latter, a lever controlling mechanism connected with said frame and rear axle support and adapted to actuate said frame to cause thereby said friction-rollers to be thrown respectively into and out of engagement with certain of the road wheels, an endless conveyer and gear- and-sprocket mechanism controlled from a road-wheel for actuating said conveyer, substantially as and for the purposes set forth.

5. The combination, in a street sweeping machine, of a movable-frame carrying a gathering-box with movable fingers, a revoluble brush, friction-rollers, sprocket wheels and chains connected with said brush and friction rollers, a lever controlling link-mechanism adapted to actuate said frame to cause said friction rollers to engage and disengage certain of the road wheels, a conveyer, and mechanism located on one side of the machine and operated from one of the road-wheels for imparting motion to said conveyer so as to automatically cause matter elevated thereby to be dumped into a carrier mounted in the machine, substantially as and for the purposes set forth.

6. The combination, in a street sweeping machine, of a movable-frame with a downwardly curved end, a gathering-box, a rotatable collecting device located in proximity to said box and supported by said frame, friction rollers journaled to the downwardly curved ends of said frame, sprocket mechanism between and connected with said rotatable collecting device and friction-rollers, means connected with said frame and one of the axle supports of the machine and adapted to be operated so as to cause said friction-rollers to engage and disengage certain of the road-wheels, an endless bucket conveyer and mechanism located on one side of the machine and actuated from one of the road wheels to impart motion to a sprocket-mechanism controlling the movement of said conveyer, substantially as and for the purposes set forth.

7. The combination, in a street sweeping machine, of a movable-frame supporting a gathering-box with movable fingers, a revoluble brush and friction-rollers, means connecting said rollers with said brush, a link mechanism connected with said frame and one of the axle supports and provided with an operating lever adapted to control the movement of said frame to cause said friction-rollers to respectively engage and disengage certain of the road-wheels, a lever provided with a pivotal locking device adapted to engage and disengage a rack and controlling arms connected with a bell crank lever and with said frame and adapted to permit of the raising and lowering of said frame, an endless conveyer and mechanism located on one side of the machine and operated from one of the road-wheels to impart motion to means adapted to actuate said conveyer, substantially as and for the purposes set forth.

8. The combination, in a street sweeping machine, of a movable-frame supporting a gathering-box with movable fingers, a brush and friction-rollers, mechanism connected with said rollers and brush, stirrups for limiting the range of movement of said frame, a link-mechanism connected with said frame and one of the axle supports and provided with a lever adapted to cause said rollers to respectively engage and disengage certain of the road-wheels, a lever controlling rods connected with a sector-wheel and a bell-crank lever to raise and lower said frame and fingers, an endless conveyer and mechanism connected with one of said road wheels and operated thereby to impart motion to a sprocket mechanism controlling the movement of said conveyer, substantially as and for the purposes set forth.

9. The combination, in a street sweeping machine, of a movable-frame supporting a gathering-box, a revoluble brush and friction-rollers, sprocket chains connecting said brush with said rollers, mechanism connected with said frame and operating to cause said friction-rollers to respectively engage and disengage certain of the road-wheels of the machine, a gear-mechanism connected with one of said road-wheels and imparting motion to traveling pulleys and sprocket-wheels and chains connected with a suitable frame, and an endless bucket conveyer adapted to travel around guide rolls journaled in the gathering-box, substantially as and for the purposes set forth.

10. The combination, in a street sweeping machine, of a movable-frame carrying a gathering-box, a revoluble brush and friction-rollers, chains connecting said brush with said rollers, mechanism connected with said frame and operating to cause said friction rollers to respectively engage and disengage certain of the road-wheels, an endless conveyer, a gear mechanism connected with one of the said road-wheels and imparting motion to a mechanism controlling the movement of said conveyer adapted thereby to automatically discharge the gathered matter into a carrier of said machine, substantially as and for the purposes set forth.

11. The combination, in a street sweeping machine, of a movable-frame supporting a gathering-box provided with a hood and movable fingers, a revoluble brush and rollers adapted to frictionally engage certain of the road-wheels, means connecting said brush with said rollers, a link-mechanism connected with said frame and one of the axle supports and provided with a lever adapted to be actuated so as to move said frame longitudinally and thereby to cause said friction rollers to be brought into and out of engagement with certain of the road-wheels, an automatic conveyer provided with buckets and mechanism located on one side of the machine and actuated from one of the road-wheels to cause motion to be imparted to a sprocket mechanism for lifting the gathered matter by means of said conveyer and dumping the same into the carrier of the machine and so as to be discharged therefrom, substantially as and for the purposes set forth.

12. The combination, in a street sweeping machine, of a movable frame carrying a gathering-box provided with movable fingers, a sweeping device and friction-rollers, means connecting said rollers with said sweeping-device, mechanism connected with said frame and rear axle-support of the road-wheels and adapted to move said frame and thereby cause said friction rollers to be brought into and out of engagement with the rear road-wheels, and a lever controlling the movement of said fingers and frame, substantially as and for the purposes set forth.

13. A street sweeping machine provided with a movable frame having friction rollers, a gathering box and a movable brush, means connected with said brush and rollers and adapted to permit of the actuation thereof, a link mechanism connected with said frame and running gear of the machine and actuated by a lever to cause said friction-rollers to engage and disengage certain of the road-wheels, an endless conveyer, means, substantially as described, actuated from one of the road-wheels for automatically operating said conveyer, and a carrier mounted in the body of the vehicle and adapted to permit of the discharge of matter deposited by the conveyer therein, substantially as and for the purposes set forth.

In testimony whereof I have hereunto set my signature in the presence of two subscribing witnesses.

WILLIAM F. WILSON.

Witnesses:
HENRY S. STEVENS,
EUGENE D. EGBERT.